United States Patent [19]

Nakanishi

[11] Patent Number: 4,504,167
[45] Date of Patent: Mar. 12, 1985

[54] RELEASABLE JOINT STRUCTURE
[75] Inventor: Masahiro Nakanishi, Tochigi, Japan
[73] Assignee: Kabushiki Kaisha Bandai, Tokyo, Japan
[21] Appl. No.: 542,328
[22] Filed: Oct. 17, 1983
[51] Int. Cl.³ .............................................. F16B 21/00
[52] U.S. Cl. ..................................... 403/325; 403/328; 292/DIG. 72
[58] Field of Search ............... 292/DIG. 72, 333, 302, 292/179; 24/615, 647, 652; 403/325, 327, 322, 328, 324

[56] References Cited
U.S. PATENT DOCUMENTS

| 1,198,509 | 9/1916 | Anderson | 292/179 |
| 2,046,342 | 7/1936 | Muck et al. | 403/328 X |
| 3,768,847 | 10/1973 | Buck, Jr. et al. | 292/302 X |
| 4,370,773 | 2/1983 | Hadary | 403/328 X |

Primary Examiner—Andrew V. Kundrat
Attorney, Agent, or Firm—Armstrong, Nikaido, Marmelstein & Kubovcik

[57] ABSTRACT

A releasable joint structure comprises an engaging device, first and second biasing members, a receiving plate, a guide rod, and a stopper member. The engaging device is inserted into a main hole formed on the receiving plate in order to push back a plate member provided on the second biasing member against the force exerted thereby. The receiving plate is then pushed laterally relative to the engaging device by a force exerted by the first biasing member, until the engagement between the plate member and the stopper member is obtained. The engaging member in this condition is pivotally supported on the peripheral of the side hole. When it is required to remove the engaging device out of the receiving plate, the guide rod is operated to attain the engagement between the plate member and the stopper member. The engagement device is then automatically pushed out of the receiving plate.

3 Claims, 3 Drawing Figures

F I G. 2.
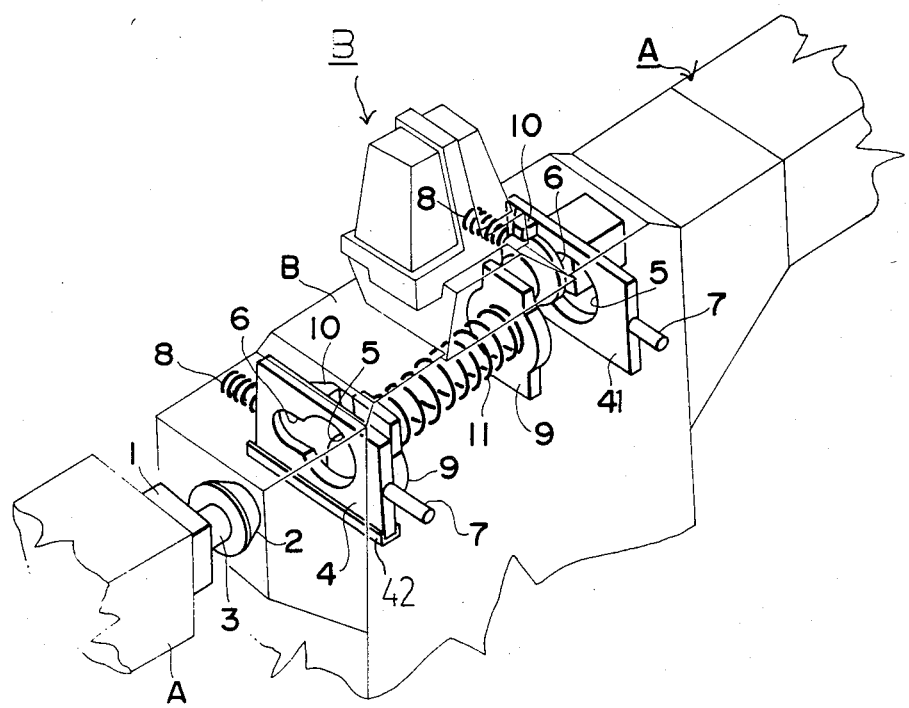

RELEASABLE JOINT STRUCTURE

BACKGROUND OF THE INVENTION

This invention relates to a releasable joint structure applicable to such as toy figures, and more particularly to a releasable joint structure between two elements for rotary movement thereabout, and in which when desired the two elements are automatically released from its joint engagement.

A mechanical device for fastening things together is widely used in the art. In the case where two elements are desired to be movably joined together, e.g., as for a head and a body, arms and a body, or legs and a body of a toy figure, various mechanical joint structures have been adopted. By way of example, these are typically a combined arrangement of a bolt and a nut about which bolt a pivotal element such as a head, arms or legs are freely or frictionally journalled and are pivoted relative to the body, or a combined arrangement of a resiliently deformable member and its receiving cavity, the member being formed on one end of a pivotal element and the cavity being formed in a body with which the member can be pivotally engaged.

When these conventional combined arrangements are used for mounting the pivotal element on the stationary body, it has been found, however, not satisfactory: the bolt and nut arrangement becomes loose as the time elapses because of the continuous vibration caused from the pivotal movement of the pivotal member; and the latter arrangement goes to a state where a stable snap engagement between the resiliently deformable member and its receiving cavity is lost because of the abrasion of the member during the long term usage thereof. Moreover, if it is advantageous in view of the capabilities of the transformability of the toy figure or of the removability of the pivotal member from the stable body, these known arrangements are relatively complicate for its operation, such as to loosen the bolt and nut, or to forcibly pull out the deformable member which necessarily causes to abrase the elastic member.

SUMMARY OF THE INVENTION

It is, therefore, a principal object of the present invention to provide a novel releasable joint structure capable of being used for a long time without causing any trouble.

It is another object of the present invention to provide a novel releasable joint structure as above which can be, when desired, operated automatically to remove one of the elements coupled by the structure from the other.

In the presently contemplated best preferred mode of the present invention, the releasable joint structure comprises engaging means, first and second biasing means, receiving plate means, guide means, and stopper means. The engaging means is adapted to be fixedly connected to a pivotal member such as an arm, and comprises a cylindrical stem portion and an enlargement portion. One end of the cylindrical stem portion to be fixed to the pivotal member is extended therefrom to the other end in a first direction to form a complete cylindrical stem portion. The other end of the cylindrical stem portion is provided with the enlargement portion, which is defined by a backward surface perpendicular to a longitudinal axis along the first direction of the stem portion, and a forward surface continuing from the backward surface. The first biasing means has a plate member with an abutting face for applying a force upon the forward surface in order to push the engaging means toward a direction opposite to the first direction.

The receiving plate means is adapted to be mounted on a stationary member, such as a body of a toy figure, for releasably joining the engaging means. The receiving plate means has a front and a rear surface parallel to the front surface, and is thinner than the length of the cylindrical stem portion along the first direction. The receiving plate means is adapted to be faced with the engaging means with the front surface being positioned perpendicular to the first direction and is formed with a hole substantially centrally thereof.

The hole is composed of a main hole and a leterally extending side hole communicating with the main hole. The main hole is larger in area than the area defined by the backward surface, and the side hole has a slightly larger clearance than the diameter of the cylindrical stem portion but slightly smaller than the area defined by the backward surface to serve as a guide path for the cylindrical stem portion, and the lateral direction is a second direction perpendicular to the first direction.

The second biasing means applies a force upon the receiving plate means in order to move the plate means toward a direction opposite to the second direction. In response to the force exerted by the second biasing means, the receiving plate means is guided through the guide means mounted on the plate means. The guide means is utilized also as an operating lever to automatically disengage the engaging means from the plate means.

The stopper means mounted on the rear surface of the receiving plate means stops the movement of the plate means by abutting on the abutting face of the plate member.

With the above construction, when the engaging means is inserted into the main hole, the plate member pushes the forward surface of the engaging means, and when the engaging means is pushed against the plate member, the lock between the plate member and the stopper means is released, thereby urging the engaging means to slide upon the side hole. Thus, the joint relation between the pivotal member and the stationary member is obtained in such a manner that the plate member pushes the backward surface of the enlargement portion against the rear surface of the receiving plate means.

The foregoing and other objects, the features and the advantages of the present invention will be pointed out in, or apparent from, the following description of the presently preferred embodiment, by way of example, with reference to the accompanying drawings.

BRIEF DESCRIPTION OF THE DRAWINGS

FIG. 2 is a perspective view showing the releasable joint structure of the present invention, which is applied to releasably fastening the arms and the body of a toy robot shown as made of a transparent material for the purpose of clearly illustrating a mounting relation.

DETAILED DESCRIPTION OF THE PREFERRED EMBODIMENT

Figure 1:
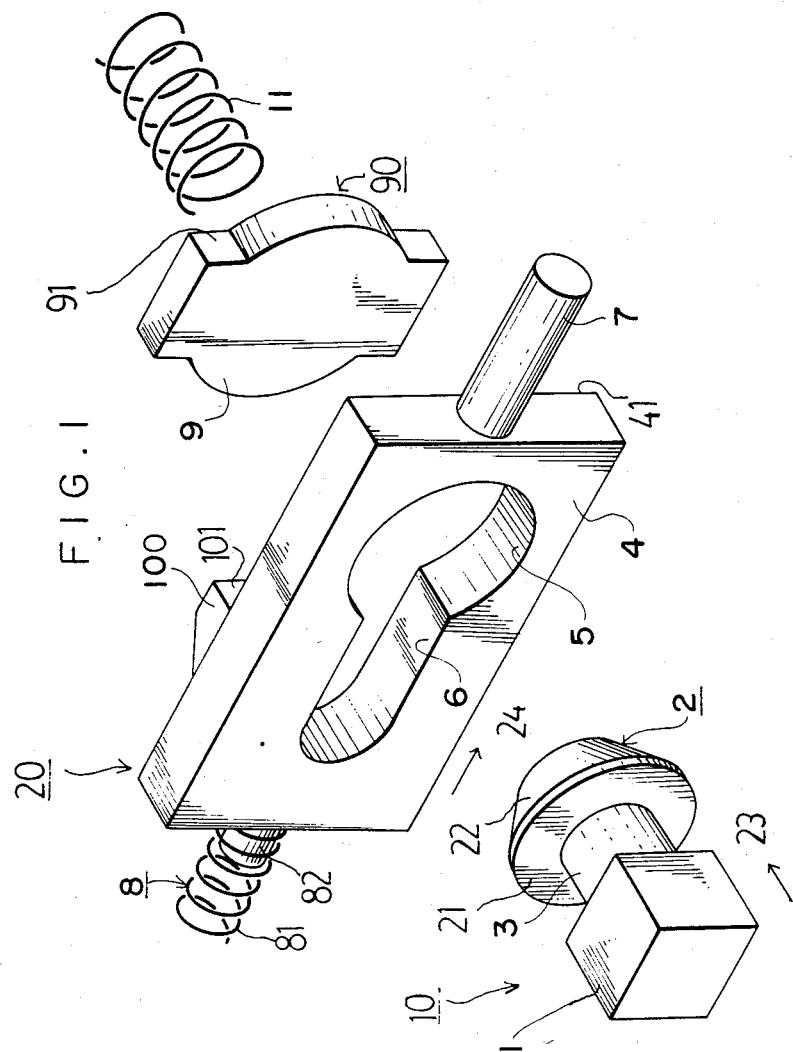
FIG. 1 is an exploded perspective view of the elements constituting the preferred embodiment in accordance with the present invention.

The presently preferred embodiment of the releasable joint structure will now be described in detail with reference to FIGS. 1 to 3. The joint structure of this embodiment comprises mainly an engagement device 10 and its receiving plate 20.

The engaging device 10 comprises a base portion 1, an enlargement portion 2, and a cylindrical stem portion 3. With this construction, the engaging device 10 is fixedly connected to a pivotal member, such as arms A of a toy robot (see FIG. 2), through the base portion 1. The provision of the base portion 1 to the engaging device 10 is preferable, but it may be omitted by connecting the cylindrical stem portion directly to the pivotal member. The enlargement portion 2 is formed integrally with the stem portion 3 at the one end remotest from the pivotal member A. The enlargement portion 2 is of a truncated cone shape and has a backward surface 21 and a forward surface 22 tapering evenly to a virtual apex. The backward surface 21 is formed in a perpendicular relation to a longitudinal axis of the stem portion 3. The direction of the longitudinal axis is hereinafter referred to as a first direction as shown by an arrow 23. Preferably, the enlargement portion 2, the base portion 1, and the cylindrical stem portion 3 are made integral by using either individual elements or a single material.

The receiving plate 20 is adapted to be mounted on a stationary member, such as a body of the toy robot (represented by a symbol B in FIG. 2) in a manner hereinafter described, for releasably joining the engaging device 10. The receiving plate 20 has a front surface 4 and a rear surface 41 parallel to the front surface 4. The thickness of the plate 20 is selected to be thinner than the length of the stem portion 3 along the first direction 23. The receiving plate 20 is slidably mounted on and within the body B by means of a guide rail 42 which is fixedly connected on the body B. The guide rail 42 for the right-side receiving plate 20 in FIG. 2 is omitted. Thus, the receiving plate 20 can be positioned in such a manner that the front surface 4 faces with the engaging device 10, with the front surface 4 being perpendicular to the first direction 23.

The receiving plate 20 is formed with a hole substantially centrally of the receiving plate 20. The hole comprises a main hole 5 and a laterally extending side hole 6 communicating with the main hole 5. The main hole 5 is formed to have a larger area than the area defined by the backward surface 21 so that the engaging device 10 can be freely inserted into the main hole 5. The side hole 6 is formed to have a slightly larger clearance than the diameter of the cylindrical stem portion 3 so that the stem portion 3, and hence the engaging device 10, can be introduced into the side hole 6 from the main hole 5. In addition to the slightly larger clearance of the side hole 6, the side hole 6 is also formed to have a smaller area than the area defined by the backward surface 21 so that the engaging device 10 is prevented from slipping out of the side hole 6 when the engaging device 10 and the receiving plate 20 is in a joining condition as later described.

The receiving plate 20 is provided with a biasing member 8 at one side face of the receiving plate 20 for causing the plate 20 to move toward a second direction as shown by an arrow 24. The first biasing member 8 preferably comprises a coil spring 81 and a protrusion 82. The coil spring is connected at one end thereof to the stationary body B and at the other end thereof coupled to the protrusion 82 mounted on the side surface of the plate 20. On the other side surface of the plate 20, there is provided a guide rod 7 which is inserted in the back of the robot body B (FIG. 2) for access of the rod 7 outwardly of the body B. The rod 7 may be used for releasing the joint relation between the engaging device 10 and the receiving plate 20 as later described.

A second biasing member 90 is provided which comprises a plate member 9 and a spring 11. The coil spring 11 is connected at one end thereof to the body B and at the other end thereof to the rear surface of the plate member 9. The plate member 9 has a surface dimension substantially covering the main hole 5, and is provided with an abutting surface 91. The second biasing member 90 is so positioned to face the front surface of the plate member 9 with the rear surface 41 of the receiving plate 20. The abutting surface 91 is also so positioned to confront with a side surface 101 of a stopper device 100 which is mounted on the rear surface 41 of the receiving plate 20. The second biasing member 90 applies a force upon the rear surface 41 of the receiving plate 20 in a normal state. And in an inserted state of the engaging device 10 into the main hole 5 as well as the side hole 6, the second biasing member 90 applies the force upon the forward surface 22 of the enlargement portion 22.

The operation of releasable fastening of the joint structure constructed as above will be described. In an initial condition where the engaging device 10 is not still inserted into the hole of the receiving plate 20, the receiving plate 20 is moved toward and stops at a limit position by the force exerted by the first biasing member 8. The limit position is determined by the contact of the side surface 101 of the stopper member 100 to the abutting surface 91 of the plate member 9 of the second biasing member 90. In this condition, since the plate member 9 is applied with the force exerted by the coil spring 11, the plate member 9 covers the main hole 5.

Upon forcibly inserting the engaging device 10 into the main hole 5 against the force applied to the plate member 9, the plate member 9 is pushed toward back, thereby releasing the engagement between the stopper member 100 and the plate member 90. As a result, the receiving plate 20 is pushed toward right as viewed in FIG. 1. Since the longitudinal length of the stem portion 3 is wider than the thickness of the plate 20, the engaging device 10 is led into the side hole 6, with the backward surface 21 sliding along the rear surface 41 of the plate 20. This is because of the fact that the plate member 9 is always pushing the enlargement portion 22 opposite to the direction 23. It is to be noted that the second biasing member 90 is held in touch with the enlargement portion 22 even in an engagement state of the engaging device 10 with the side hole 6, due to the fact that the top surface of the enlargement portion 22 extends more outwardly toward the plate member 9 than the stopper member 100.

When it is desired to remove the pivotal member A from the body B, the guide rod 7 emerging outwardly of the rear body of the body B is pushed in. Then, the receiving plate 20 is pushed toward left in FIG. 1 against the forces exerted by the spring 81, until the engagement between the side surface 101 and the abutting surface 91 occurs. This results in the movement of the engaging device 10 into the main hole 5. Since the enlargement portion 22 is pushed in turn by the plate member 9 energized by the coil spring 11, the engagement device 10 is automatically thrown out of the body B.

In the embodiment particularly shown in FIG. 2, the coil spring 11 is used both for the right and left second biasing members, however it may be used individually for both members by providing two coil springs 11 as described in the foregoing description.

Figure 3:
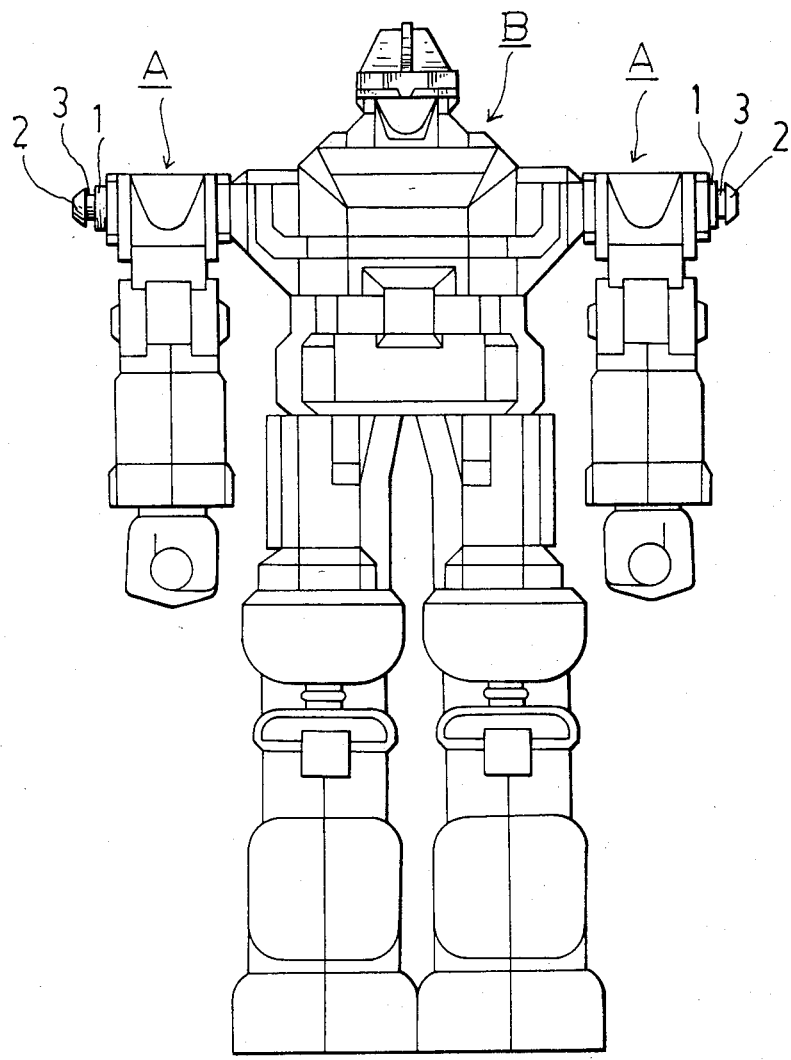
FIG. 3 is a front elevational view showing a toy robot whose arms are provided with a part of the releasable joint structure in accordance with the present invention, and whose body is provided with the other remaining parts of the releasable joint structure.

FIG. 3 shows a fastening state of the arm A and the body B by means of the releasable joint structure according to the embodiment. In this embodiment, the engaging device is provided on both sides of the arm A, one of them is submerged into the body B and the other of them is appearing outside.

As seen from the above description, the relesable joint structure according to the present invention can make it possible to automatically release the fastening relation between two elements. Moreover, the fastening relation is ensured by the larger area of the backward surface relative to the area defined by the side hole. Furthermore, since the second biasing member 90 can be easily adjusted with respect to its coil spring force, the pivotal movement with friction between the rearward surface and the rear surface, respectively of the engaging device and of the receiving plate, can be readily controlled for attaining a best suitable condition.

Other embodiments of the invention will be apparent to those skilled in the art from a consideration of this specification or practice of the invention disclosed herein. It is intended that the specification and examples be considered as exemplarly only, with the true scope and spirit of the invention being indicated by the following claims.

What is claimed is:

1. A releasable joint structure for mounting a pivotal member on a stationary member comprising:
    engaging means which is adapted to be fixedly connected to said pivotal member and comprises a cylindrical stem portion and an enlargement portion, one end of said cylindrical stem portion to be fixed to said pivotal member being extended from said one end to the other end of said cylindrical stem portion in a first direction, and the other end of said cylindrical stem portion being provided with said enlargement portion, said enlargement portion being defined by a backward surface perpendicular to a longitudinal axis along said first direction of said cylindrical stem portion and a forward surface continuing from said backward surface;
    receiving plate means adapted to be mounted on said stationary member for releasably joining said engaging means, said receiving plate means having a front surface and a rear surface parallel to said front surface and being thinner than the length of said cylindrical stem portion along said first direction, said receiving plate means being adapted to be faced with said engaging means with said front surface being positioned perpendicular to said first direction and being formed with a hole substantially centrally of said receiving plate means, said hole comprising a main hole and a laterally extending side hole communicating with said main hole, said main hole being larger in area than the area defined by said backward surface, said side hole having a slightly larger clearance than the diameter of said cylindrical stem portion but slightly smaller than said area to serve as a guide path for said cylindrical stem portion, and said lateral direction being a second direction perpendicular to said first direction; and
    first biasing means comprising a coil spring and a plate member, said coil spring being connected at one end thereof to said stationary member and at the other end thereof to said plate member, and in which said plate member abuts on said back surface of said receiving plate means, for applying a force upon said forward surface in order to push said backward surface of said enlargement portion against said rear surface of said receiving plate means.

2. A releasable joint structure as set forth in claim 1, in which said plate member is provided with an abutting face, and said releasable joint structure further comprises:
    second biasing means for applying a force upon said receiving plate means in order to move said plate means toward a direction opposite to said second direction;
    guide means mounted on said receiving plate means for guiding said receiving means in response to said force exerted by said second biasing means; and
    stopper means mounted on the rear surface of said receiving plate means for stopping the movement of said plate means against said force exerted by said second biasing means by abutting on said abutting face of said plate member.

3. A releasable joint structure for mounting a pivotal member on a stationary member comprising:
    engaging means which is adapted to be fixedly connected to said pivotal member and comprises a cylindrical stem portion and an enlargement portion, one end of said cylindrical stem portion to be fixed to said pivotal member being extended from said one end to the other end of said cylindrical stem portion in a first direction, and the other end of said cylindrical stem portion being provided with said enlargement portion, said enlargement portion being defined by a backward surface perpendicular to a longitudinal axis along said first direction of said cylindrical stem portion and a forward surface continuing from said backward surface;
    first biasing means having a plate member with an abutting face for applying a force upon said forward surface in order to push said engaging means toward a direction opposite to said first direction;
    receiving plate means adapted to be mounted on said stationary member for releasably joining said engaging means, said receiving plate means having a front and a rear surface parallel to said front surface and being thinner than the length of said cylindrical stem portion along said first direction, said receiving plate means being adapted to be faced with said engaging means with said front surface being positioned perpendicular to said first direction and being formed with a hole substantially centrally thereof, said hole comprising a main hole and a laterally extending side hole communicating with said main hole, said main hole being larger in area than the area defined by said backward surface, said side hole having a slightly larger clearance than the diameter of said cylindrical stem portion but slightly smaller than said area to serve as a guide path for said cylindrical stem portion, and said lateral direction being a second direction perpendicular to said first direction;

second biasing means for applying a force upon said receiving plate means in order to move said plate means toward a direction opposite to said second direction;
guide means mounted on said receiving plate means for guiding said receiving means in response to said force exerted by said second biasing means; and,
stopper means mounted on the rear surface of said receiving plate means for stopping the movement of said plate means against said force exerted by said second biasing means by abutting on said abutting face of said plate member;
whereby when said engaging means is inserted into said hole of said receiving plate means, said plate member pushes said forward surface of said engaging means, and when said engaging means is slid into said side hole, said plate member pushes said backward surface of said enlargement portion against said rear surface of said receiving plate means.

* * * * *